Oct. 31, 1967   F. W. HAUF ET AL   3,349,627

ROTATED VIBRATING WHISKER GYRO

Filed Oct. 2, 1964

INVENTOR.
FREDERICK W. HAUF
WILLIAM H. QUICK
BY
ATTORNEY

United States Patent Office 3,349,627
Patented Oct. 31, 1967

3,349,627
ROTATED VIBRATING WHISKER GYRO
Frederick W. Hauf, Santa Ana, and William H. Quick, La Mirada, Calif., assignors to North American Aviation, Inc.
Filed Oct. 2, 1964, Ser. No. 401,177
10 Claims. (Cl. 73—505)

This invention relates to a reference apparatus and more specifically to a new and improved rod type vibrating reference apparatus.

When vibrating elongated members or rods are employed as an inertial reference, the restoring forces of the vibrating rod depends on the bending or elasticity of the rod. Thus, the elastic asymmetry of the vibrator is of the utmost importance. Anisoelasticity of the vibrating rod can lead to elliptical motion which, if the restoring force is not strictly linear, results in rotation of the plane of vibration of the rod. Hence, any anisoelasticity produces drift in terms of the gyroscopic art.

Therefore, an object of the invention is to provide a vibrating rod stable reference system which has a minimum of drift.

A further object of the invention is the provision of a vibrating rod reference system which defines a vibrating path and has a minimum of drift.

A still further object of the invention is to provide a vibrating rod spatial reference system having a minimum of anisoelastic drift and damping drift.

A further object of the present invention is a stable spatial direction indicator wherein the stable element consists of a vibrating rod. In such a vibrating rod type system, the lack of symmetry at the mounting end of the rod results in torques on the rod which torques effect rotation of the vibratory path of the rod so as to produce unpredictable drift. In the present invention this unpredictable drift is minimized by spinning the rod about its longitudinal center line of symmetry so as to tend to cancel out these anisoelasticities. As a result, the drift is minimized.

Other objects and advantages will become apparent from the reading of the specification taken in conjunction with the accompanying drawings wherein.

Figure 1:
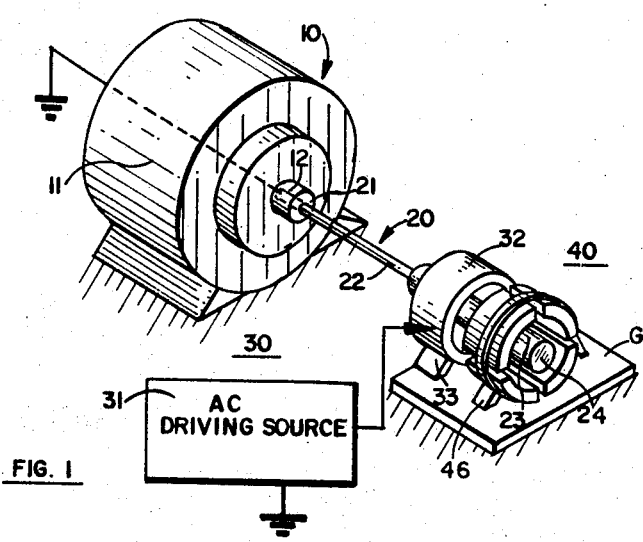
FIG. 1 illustrates a vibratory stable reference system embodying the invention.

As shown in FIG. 1 of the drawings, there is employed a supporting means 10 for rotatably mounting a vibratory rod 20. The vibratory rod 20 is mounted in a horizontal position. A drive means 30 is employed to vibrate the free end of the rod 20 in a predetermined plane. Pickoff means 40 is employed which provides information with respect to the relationship of the vibratory plane and its casing. In the present invention, the vibratory rod 20 is rotated by the supporting means 10 while it is being forced to vibrate in a plane by drive means 30.

More specifically, the supporting means 10 includes a motor 11 having a chuck 12 for receiving one end 21 of the vibratory rod 20. The vibratory rod 20, therefore, is rotatably mounted. When motor 11 is actuated, vibratory rod 20 and chuck 12 will rotate at a predetermined speed.

The vibratory rod 20 includes a reduced diameter cylindrical section 22 and a larger diameter co-axial cylindrical section 23 which is free to vibrate in a plane. The end of cylindrical section 23 terminates in a transverse end 24.

A drive means 30 is employed to vibrate the free end of rod 20 in a plane so as to thereby provide a stable spatial reference plane. This drive means includes an A-C driving source 31 which is connected to a conductive ring member 32. Ring member 32 is fixedly mounted with respect to a casing G or earth by two electrical insulating legs 33 (only one leg is shown) which are secured to a casing G. Normally the conductor ring 32 is preferably mounted co-axial with the axis of vibratory rod 20. As will be explained later, however, such a relationship is difficult to achieve.

Figure 3:
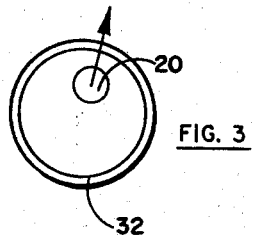
FIGS. 3 and 4 are illustrations useful in explaining the invention.
Figure 2:
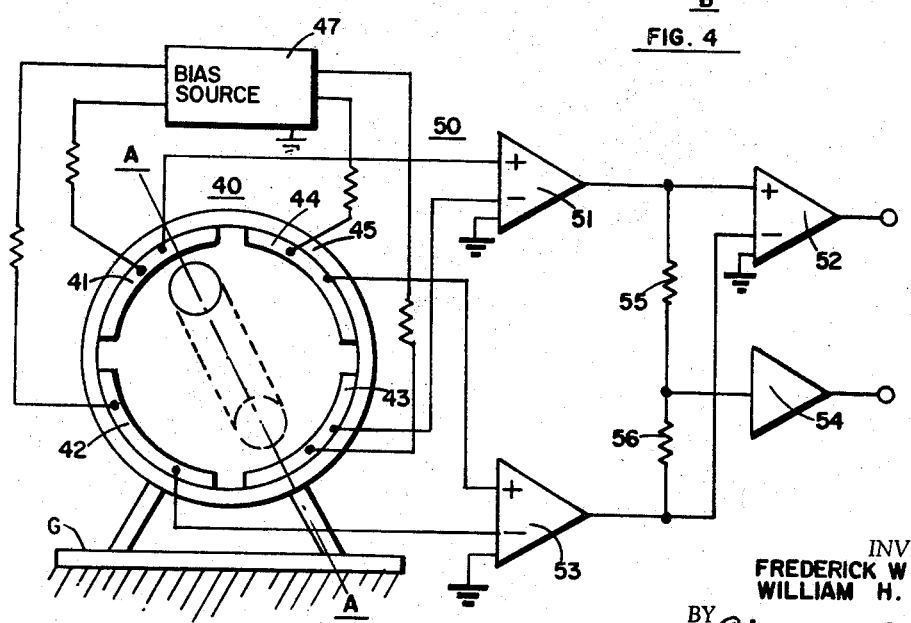
FIG. 2 illustrates in block form the control circuitry employed with the embodiment illustrated in FIG. 1.

As shown in FIG. 2, the end 21 of rod 20 is electrically connected to ground and the alternating current driving source 31 has its output connected between ring 32 and ground. Thus, an electrostatic force is applied between cylindrical section 23 and ring 32. This provides the force necessary to electrostatically drive the rod 20 in a stable reference plane. As shown in FIG. 3, the drive ring 32 is circular and consequently the electrostatic force is always in a direction of the deflection so that coersion on the plane of vibration is not produced by this drive.

Also mounted on the casing G is an electrostatic pickoff means 40 to sense the vibrating plane of rod 20. This pickoff includes circularly shaped and circularly disposed conductive capacitive plates 41, 42, 43, and 44. These plates define a circle having a center the same as the center defined by chuck 12 in mounting end 21 of rod 20. The capacitive plates 41–44 are secured to a circular insulating support member 45 having two downwardly extending legs 46 which are secured to casing G to provide the above relationship. The plates 41, 42, 43, and 44 are connected to a voltage bias source 47 through high resistances. This bias source provides a voltage between plates 41, 42, 43 and 44 and grounded rod 20 to enable an electrostatic readout.

Circuit means 50 is employed which provides an output that is a function of the relationship of the vibratory plane of rod 20 with respect to casing G. This circuit means includes differential amplifiers 51, 52, and 53 of the type which will subtract one signal from another so as to provide at its output a signal which varies as a function of the differential of the two input signals of the gain of the amplifier if any. The plate 41 is connected to the plus input of differential amplifier 51 and the plate 43 is connected to the minus input of differential amplifier 51. Thus, the output of differential amplifier 51 provides a signal which is directly proportional to the position of the vibrating plane A—A of the outer end portion 23 with respect to capacitive plates 41 and 43.

The plate 44 is connected to the positive input of differential amplifier 53 and the plate 42 is connected to the negative input of differential amplifier 53. Thus, the output of amplifier 53 provides a signal which is directly proportional to the position of vibrating plane A—A with respect to plates 44 and 42.

The output of amplifier 51 is connected to the plus input of differential amplifier 52 and the output of amplifier 53 is connected to the minus input of amplifier 52. Hence, the output of amplifier 52 is the difference between signals from amplifier 51 and amplifier 53.

A voltage divider including resistor 55 and 56 are connected between the amplifiers 51 and 53. This provides an input into amplifier 54, the output of which can be employed as a reference signal of the rod position.

Normally the vibratory plane A—A of rod 20 would be maintained midway between plate 41 and 44 either by torquing the rod 20 or by rotating assembly 40 with respect to casing G. In such a condition amplifier 52 would have no output. If plane A—A tends to rotate counterclockwise as shown in FIG. 2, there will be a large output from amplifier 51 and a small output from amplifier 53. If the plane A—A rotates in the opposite direction, the output of amplifier 53 will be large and 51 small. The output of operational amplifier 54 acts as a reference for a demodulator so a comparison of the outputs of 52 and 54 will determine which direction plane A—A has rotated in relation to the casing. The amount of displacement will be a function of the amplitude of the output of amplifier 52.

Thus, the output of 52 and 54 can be used to torque rod 20 or assembly 40 to provide no output from amplifier 52.

It will be understood that the electrostatic pickoff 40 and circuit means 50 are merely by way of illustrating a means to determine the position of the vibrating plane with respect to casing G. Other means can be employed which are well known in the art. In the specific illustration all the amplifiers 51, 52, and 53 can either be current or voltage sensitive but to obtain proper phase they must all be the same.

Figure 4:
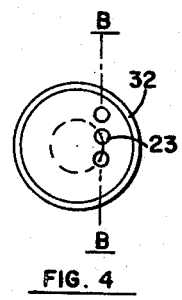

Due to the unsymmetrical elasticity of most suitable rods, unequal force vectors are frequently affected and as a result, a conventional cantilever type vibratory reference will tend to have drift so that the plane of vibration will rotate without spatial movement of the device. In addition, the axis of the vibrating element as shown in FIG. 4, is frequently at least slightly off center from the drive ring 32 and the pickoff 40 so as to tend to vibrate in a plane B—B. This also can result in excessive drift of the plane of vibration of the rod 20. In both cases, considerable improvement has been realized by spinning the whisker by some motor means such as 11 during vibration in its stable reference vibrating plane. It has been found, that the rotary speed or rotational speed of rod 20 must be far below the speed of vibration in its reference plane, so as to prevent the motion from becoming unstable and causing the rod to whip. If, however, too slow a speed of rotation is employed elastic motion could build up during one quarter of a cycle before it is cancelled out during the next quarter cycle. A suitable ratio of frequency of vibration in the vibratory plane due to frequency of rotation of the rod 20 has been in the neighborhood of roughly 10 to 1 for near optimum results. It will be understood that rod 20 would be made of some suitable elastic material which is conductive or has been made conductive.

Although the invention has been described and illustrated in detail, it is to be clearly understood that this is by way of illustration and example only with the spirit and scope of the invention being limited only by the terms of the appended claims.

We claim:

1. A vibratory stable reference apparatus comprising a casing, a vibratory rod having a longitudinal axis rotatably supported at one end and free at its other end to vibrate in a vibratory path, means for vibrating said rod in said vibratory path, means rotating said rod at a constant speed about said longitudinal axis with respect to said casing, and means sensing the relationship of said path with respect to said casing.

2. A vibratory stable reference apparatus comprising a casing, a cantilevered vibratory rod having a longitudinal axis and supported at one end, means vibrating said rod in a vibratory path, means for simultaneously rotating said rod at a constant speed about said longitudinal axis with respect to said casing, and pickoff means for sensing the angular relationship of said path with respect to said casing.

3. A vibratory stable reference apparatus comprising a casing, a vibratory rod having a longitudinal axis rotatably supported at one end and free to vibrate at its other end in a vibratory path, means for vibrating said rod, means for rotating said rod at a constant speed about said longitudinal axis with respect to said casing and means for sensing the angular relationship between said path and said casing.

4. A vibratory stable reference apparatus comprising a casing, supporting means, a vibratory rod mounted at one end for rotation with respect to said supporting means and free to vibrate its other end in a vibratory path, means vibrating said rod in said vibratory path, drive means rotating said rod at a constant speed about its longitudinal center line with respect to said casing, and pickoff means providing a signal which varies as a function of the angular relationship of said path.

5. A vibratory reference apparatus comprising:
   an elongated member having a longitudinal axis;
   means for vibrating said member with respect to said longitudinal axis, said means for vibrating said member comprising:
   a source of alternating current signal;
   a conductive ring disposed transversely around said elongated member; and
   means for applying said alternating current signal between said ring and said member; and
   means for simultaneously spinning said elongated member about said longitudinal axis.

6. A vibratory reference apparatus comprising:
   an elongated member having a longitudinal axis;
   means for vibrating said member with respect to said longitudinal axis;
   means for simultaneously spinning said elongated member about said longitudinal axis; and
   means for sensing the plane of vibration of said member.

7. The combination of claim 6 wherein said means for sensing comprises:
   pickoff means disposed around said member, said pickoff means including plural sets of oppositely disposed conductive plates for sensing the position of said member; and
   circuit means coupled to said pickoff means for providing a differential signal which is a function of the plane of vibration of said elongated member.

8. A vibratory reference apparatus comprising:
   an elongated member having a longitudinal axis;
   means for supporting said member at one end thereof, said means including motor means coupled to said member for spinning said member about said longitudinal axis; and
   means for vibrating said member with respect to said longitudinal axis, said means for vibrating said member comprising:
   a source of alternating current signal;
   a conductive ring disposed transversely about the free end of said member; and
   means for applying said alternating current signal between said ring and said member.

9. A vibratory reference apparatus comprising:
   an elongated member having a longitudinal axis;
   means for supporting said member at one end thereof, said means including motor means coupled to said member for spinning said member about said longitudinal axis;
   means for vibrating said member with respect to said longitudinal axis; and
   means for sensing the plane of vibration of said member.

10. The combination of claim 9 wherein said means for sensing comprises:
pickoff means disposed around the free end of said member, said pickoff means including plural sets of oppositely disposed conductive plates for sensing the position of said member; and
circuit means coupled to said pickoff means for providing a differential signal which is a function of the plane of vibration of said elongated member.

References Cited
UNITED STATES PATENTS

| | | | |
|---|---|---|---|
| 2,309,853 | 2/1943 | Lyman et al. | 73—505 |
| 2,486,567 | 11/1949 | Lazan | 73—67.3 X |
| 2,552,650 | 5/1951 | Rawlings | 73—505 X |
| 3,122,020 | 2/1964 | Hack | 73—462 |
| 3,181,373 | 5/1965 | Vootsas | 73—517 |
| 3,209,584 | 10/1965 | Lathrop | 73—67.3 X |

JAMES J. GILL, *Primary Examiner.*